No. 657,445. Patented Sept. 4, 1900.
J. S. PATTEN.
ANTIFRICTION BEARING FOR CAR TRUCKS.
(Application filed Jan. 19, 1900.)
(No Model.)
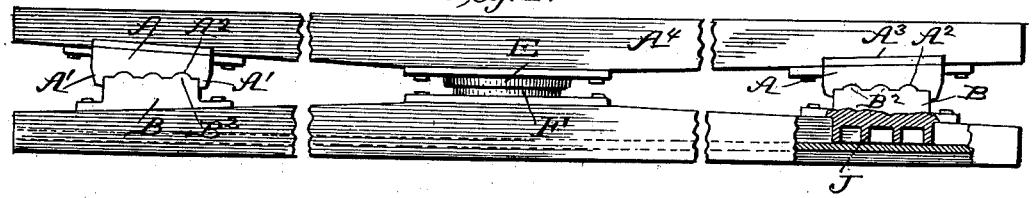
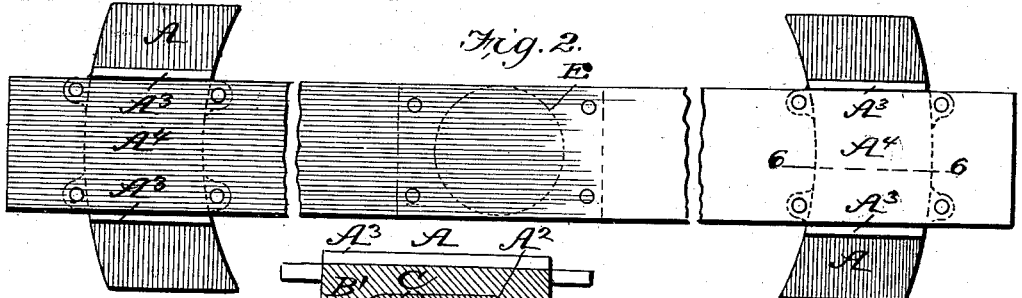
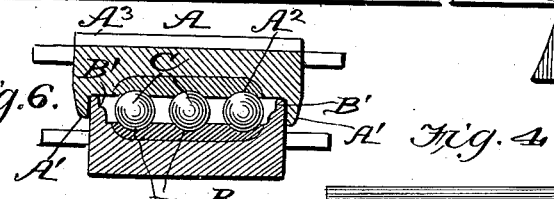
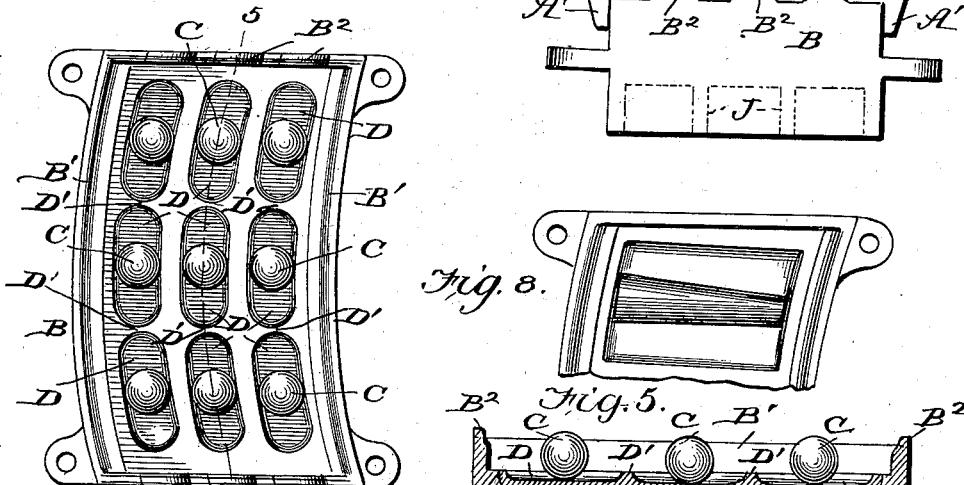
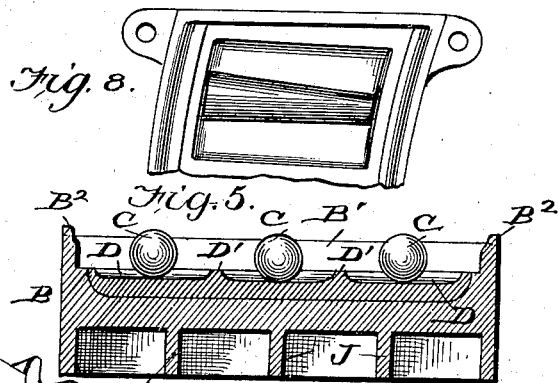
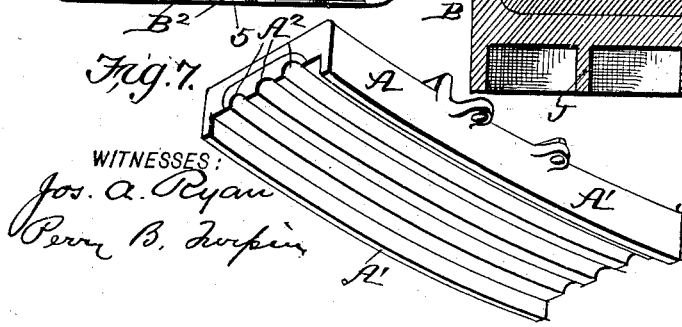
WITNESSES:
Jos. A. Ryan
Perry B. Turpin
INVENTOR
James S. Patten
BY Munn & Co.
ATTORNEYS

UNITED STATES PATENT OFFICE.

JAMES S. PATTEN, OF BALTIMORE, MARYLAND.

ANTIFRICTION-BEARING FOR CAR-TRUCKS.

SPECIFICATION forming part of Letters Patent No. 657,445, dated September 4, 1900.

Application filed January 19, 1900. Serial No. 2,024. (No model.)

*To all whom it may concern:*

Be it known that I, JAMES S. PATTEN, residing at Baltimore, in the State of Maryland, have invented a new and useful Improvement in Antifriction-Bearings for Car-Trucks, of which the following is a specification.

This invention is an improvement in antifriction-bearings designed for use on railway-car trucks, wagons, or in other locations where such a bearing would be desirable; and the invention consists in certain novel constructions and combinations of parts, as will be hereinafter described and claimed.

In the drawings, Figure 1 is a side view, and Fig. 2 a top plan view, of a bearing embodying my invention. Fig. 3 is a detail top plan view of the lower portion of the outer bearing. Fig. 4 is a front view of the outer bearing. Fig. 5 is a sectional view on about line 5 5 of Fig. 3. Fig. 6 is a cross-sectional view on about line 6 6 of Fig. 2. Fig. 7 is a detail inverted perspective view of the lower bearing, and Fig. 8 illustrates the use of rollers instead of balls.

In my present invention I have among other objects in view to provide a special construction of the casing of the lower portion of the outer bearing, by which the bearing-casing will readily wear off with the ordinary wear of the bearing, and thus maintain a tight fit to exclude dust without interfering with the proper supporting of the weight upon the balls held in said outer bearing. I also seek to provide the bearings with a separate pocket for each ball, so the balls will be maintained generally in the desired position and will not roll together by the tilting of the lower bearing portion in one direction or the other.

In the construction shown the outer bearing is composed of the upper portion A, the lower portion B, and the balls C within the same. The upper portion A is provided at its sides with depending flanges A' and has in its under side grooves $A^2$, which extend from end to end of the portion A and are open at their ends, as shown in the drawings. The lower portion B is provided with an upwardly-projecting flange B', which fits between the flanges A' of the portion A, and this flange B' extends along the sides and across the ends of the portion B, as shown in Fig. 5. This flange B' bears beneath the portion A, and the end portions are preferably formed at $B^2$ to fit snugly the grooved formation of the under side of the portion A, as will be understood from Fig. 4, and thus coöperate in producing a dust-tight fit of the parts. The balls C bear between the portions A and B, and as the parts wear it is desirable for the casing to correspondingly wear, so the dust-tight fit can be maintained and the weight can be practically borne upon the balls. To facilitate this result, I find it desirable to reduce the thickness of the flange B', as shown in Figs. 5 and 6, so it will readily wear down, and thus grind as the parts are worn to a smooth close fit. This is an important feature of my invention from a practical standpoint, as it operates to retain the oil or other lubricant and to exclude the dust, and so prevents any undue wear on the parts. In order to retain the balls practically in the desired relation, and thus prevent them from bunching at either end of the casing, I prefer to provide in the lower portion B pockets D, in which the balls fit individually, as is best shown in Figs. 3 and 5. These pockets D are of a width approximating that of the balls, so the latter have practically no lateral play; but the pockets are elongated circumferentially to permit the balls to roll in such direction to the extent ordinarily required for the swing of the truck. As will be understood from Figs. 3 and 5, there are slight divisions at D' between the ends of the adjacent pockets, which limit the movement of the balls in a circumferential direction, the base of the pockets being flat from end to end.

The upper portion A of the outer bearing is provided on its upper side at $A^3$ with ribs or flanges which fit on opposite sides of the bolster or beam $A^4$, which carries the upper portions of the outer bearing.

The center bearing is composed of the upper section E and the lower section or portion F.

In Figs. 5, 6, and 7 I illustrate the ball-grooves and tracks as lined. This lining may be a chilled one, of suitable iron or steel or other material, and may, in some instances, be integral with the main portion of the bearings, or may be separate and suitably fitted and held in place, as may be desired.

As before suggested, my invention may be embodied in trucks for railway cars and engines, in wagons, and in other machines where its construction will render it useful. Instead of making the antifriction devices in the form of balls, as before described, it may be desired in some instances to make them in the form of rollers, as shown in Fig. 8. In this construction the rollers may preferably be tapered to properly operate in a circumferential line.

To compensate for variations in the space between the upper and lower bolsters of a car-truck, I prefer to employ as supports for the lower truck-bearings, as shown, or for the upper bearings, or for both, if desired, a ribbed chair in the form of a hollow casting, which is provided with ribs J, extending parallel to the axis of the truck, so they will present their edges so such ribs can be cut down at such edges either with a chisel or other tool or by grinding to secure a proper fit of the bearings between the truck-bolsters. This ribbed chair may be integral with the casings of the bearings or may be made separate and suitably secured thereto, as may be desired.

Having thus described my invention, what I claim, and desire to secure by Letters Patent, is—

1. A bearing substantially as described, comprising a casing composed of an upper portion, a lower portion having an upwardly-projecting inclosing flange bearing at its upper edge beneath the upper portion and having such edge reduced in thickness, and the antifriction devices between said portions, substantially as set forth.

2. A bearing comprising a casing composed of an upper portion having its under side grooved longitudinally, a lower portion having an upwardly-projecting inclosing flange bearing at its upper edge beneath the upper portion and conformed at its upper edge to the grooves thereof, and the antifriction devices between said portions, substantially as set forth.

3. The herein-described bearing comprising a casing composed of upper and lower portions, the upper portion having longitudinal grooves and the lower portion having an upwardly-extending inclosing flange bearing at its upper edge beneath the upper portion, conformed at such edge to the grooves of the upper portion and having its upper edge reduced in thickness, and the antifriction devices fitting between said portions, substantially as set forth.

4. In a bearing substantially as described, the combination of the casing composed of the upper and lower portions, the upper portion being grooved longitudinally and the lower portion having in its upper side a plurality of individual pockets for antifriction devices and such lower side being also provided with an upwardly-projecting flange bearing beneath the lower portion and having its upper edge reduced in thickness and conformed to the grooved under side of the upper portion of the casing, and the antifriction devices in said pockets, substantially as set forth.

5. In a railway-car truck, the combination with the upper and lower truck-bearings of a chambered and ribbed chair having its ribs extending edgewise in a direction parallel to the axis of the truck whereby the chair can be conveniently cut away to fit the space between the beams or bolsters substantially as set forth.

JAMES S. PATTEN.

Witnesses:
THOS. C. BAILEY,
G. W. WATTS.